Patented June 5, 1934

1,961,196

UNITED STATES PATENT OFFICE 1,961,196

SULPHONATION OF AROMATIC AMINES

Matthew Francis Stephen Choate, Manchester, Samuel Coffey, Huddersfield, and Charles Royston Henshaw, Manchester, England, assignors to Imperial Chemical Industries Limited, a corporation of Great Britain No Drawing. Application May 1, 1931, Serial No. 534,444. In Great Britain May 2, 1930

13 Claims. (Cl. 260—129)

It is well known that such sulphonic acids of aromatic amines as sulphanilic and naphthionic acids are manufactured by what is known as the baking process (cf. Cain, Manufacture of intermediate products for dyes, London 1918, pp. 47 and 182). This process has its disadvantages: the reaction, particularly when α-naphthylamine is undergoing sulphonation by this process, does not proceed smoothly; there always remains unsulphonated a certain proportion of amine which cannot be recovered for further use. Further, it is difficult, as with other processes wherein organic substances are subjected in the solid condition to a baking temperature, to ensure that the mass is uniformly heated. The manipulation is troublesome, and various expedients, i. g. addition of sand or of oxalic acid, have been adopted to ensure that the amine sulphate which is baked is a porous mass, easily handled. It is an object of the present invention to obviate these disadvantages.

According to our invention we mix an aromatic amine with a high boiling liquid medium, chemically indifferent towards the amine, and with agitation sulphuric acid to give the acid sulphate of the amine, and heat the suspension of acid sulphate so obtained to a temperature at which conversion to amine sulphonic acid takes place, the water produced being removed as fast as it is formed.

The acid sulphate of the aromatic amine is produced by the process of our invention as a pulverulent mass, suspended in the liquid medium. When the suspension is heated, conversion takes place in accordance with the equation:

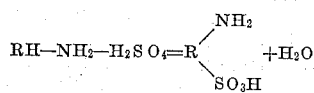

(R being a divalent aromatic radical as defined below).

The water which is so produced distils off continuously as it is formed, accompanied in some cases by some of the liquid medium employed.

There remains in the vessel used in the process a suspension of the sulphonic acid of the amine. This suspension is cooled and either filtered or the sulphonic acid is separated in any other convenient way, e. g. by extraction with aqueous alkali.

It will be obvious that in choosing our liquid medium we are guided by the following considerations, viz. (I) the liquid must be such that its boiling point, or boiling range, is as high as or higher than the temperature at which conversion of the acid sulphate of the amine into the sulphonic acid takes place; (II) it must be such that it is not preferentially attacked by sulphuric acid. We have found that the petroleum fraction known as "white-spirit", of which about 50% distils between 160 and 170° C., and which has a boiling range of 150 to 200° C. or thereabouts, is very satisfactory, but we do not confine ourselves to the use of such a substance, since we find that e. g. xylene, chlorobenzene, tetrachloroethane, solvent naphtha, kerosene, refined petroleum fractions of higher boiling point, e. g. so-called transformer-oil, or similar liquids or mixtures of these, may be used. Any such substance as is technically available is adapted to our purpose since we find that even aromatic hydrocarbons remain unattacked by the sulphuric acid.

Touching the aromatic amines to which we may apply our invention it can be said generally that those capable of undergoing sulphonation when their acid sulphate salts are baked may be sulphonated by our new process. Notably we may mention here aniline and α-naphthylamine, but we may also treat the toluidines, xylidines, chloroaniline, β-naphthylamine, and the like. The symbol RH in the formula given above represents thus the aryl radical in any of these amines.

Among the advantages resulting from the application of our invention we may mention that the products are cleaner than those obtained by the baking process, doubtless because of there having been no local overheating; the products are more homogeneous chemically, i. e. they contain a smaller proportion of such isomerides as may be formed; the unsulphonated amine, if any, is readily recovered, e. g. when the sulphonic acid is extracted by treating the suspension thereof in the residual solvent with alkali the unsulphonated base remains in the solvent; and, finally, at no stage in the process is any milling, grinding, or pulverizing necessary.

The distillation step in the process of our invention may be carried out in a variety of ways. The essential condition is that the water should be removed as fast as it is formed. We may when the liquid medium distils over with the water add more of it to prevent the suspension from becoming thick and pasty; we may vary the composition of the liquid medium to facilitate this distillation; or we may diminish the pressure in the apparatus to expedite the distillation of the water.

The proportion of sulphuric acid to base should be substantially the proportion required to form the acid sulphate RH—NH$_2$·H$_2$SO$_4$. Reasonably small variations, e. g. 5%, from the exact proportions are not objectionable, and are within the scope of our invention.

Our invention is illustrated, but not limited, by the following examples, in which the parts are by weight.

Example 1

71.5 parts of α-naphthylamine and 240 parts of petroleum "white-spirit" of boiling range 150–200° C. are mixed and the mixture is warmed to 60° C. The naphthylamine melts, and dissolves in the spirit. The solution is stirred briskly, and 51 parts of 95% sulphuric acid are slowly run in during 20 to 30 minutes. The temperature rises to about 65° C. The acid sulphate of α-naphthylamine is precipitated as a granular powder.

The temperature is raised gradually to about 160° C. when a mixture of spirit and water begins to distil. The heating is adjusted so that distillation continues slowly but steadily and another 400 parts of white spirit is gradually added, the rate of addition being kept slightly higher than the rate of distillation.

The less volatile portions of the spirit accumulate in the vessel, and the temperature of the reaction mixture rises slowly.

At about 162° C. the naphthylamine sulphate agglomerates into granules or small lumps, but the action of the stirrer prevents these from growing to an inconvenient size. The conversion of the acid sulphate to sulphonic acid now takes place, and water is liberated which distils over with the white spirit. The heating and the rate of distillation are so adjusted, allowing for the heat of reaction, that the water is removed as fast as it is formed.

At about 166° C. the material forms a sandy powder which has no tendency to cake together, and by the time that all the white spirit has been added, the temperature in the vessel is about 168° C., and the distillate is almost free from water, i. e. is no longer turbid.

Heating is continued until the temperature is 180° C., and after 1 hour at this temperature the vessel and its contents are allowed to cool.

The suspension of naphthionic acid in white spirit is now either filtered, or treated directly with aqueous alkali to separate the acid from any unchanged naphthylamine. The yield of naphthionic acid is about 90% of that calculated from the α-naphthylamine actually consumed. The material is of superior appearance, is comparatively free from decomposition products and contains a smaller proportion of soluble isomerides than the product obtained by baking.

Example 2

46.5 parts of aniline are dissolved at 60° C. in 300 ccs. of white spirit similar to that used in Example 1. 51 parts of 98% sulphuric acid are added during 20–30 minutes at 60° C., and then the reaction mixture is heated in the same manner as is described in Example 1, 400 parts of white spirit being added slowly during the distillation as already described.

The crude sulphanilic acid obtained is almost white, and the yield is 92%.

Example 3

143 parts of α-naphthylamine are stirred at 60° C. with 900 parts of high-boiling paraffin oil (transformer-oil). 100 parts of sulphuric acid monohydrate is slowly run in with stirring. The mixture is heated slowly and at the same time the pressure is diminished so that when the temperature reaches about 150° C. it is 3 inches of mercury or less. The temperature is kept at 150° C. or somewhat above, whilst all the water formed by the conversion distils. The mixture is then cooled and the naphthionic acid is extracted as described in Example 1.

As many apparently widely different embodiments of this invention may be made without departing from the spirit and scope thereof, it is to understood that we do not limit ourselves to the specific embodiments thereof except as defined in the appended claims.

We claim:

1. A process for the manufacture of sulphonic acids of aromatic amines which comprises mixing a primary aromatic amine of the benzene or naphthalene series with a liquid medium chemically indifferent towards the reactants, adding with agitation sulphuric acid to give the acid sulphate of the amine, and heating the suspension of acid sulphate so obtained to a temperature at which conversion to amine-sulphonic acid takes place, the water produced being removed as it is formed said liquid medium being a solvent for the amine and having a boiling point above the said temperature.

2. A process for the manufacture of sulphonic acids of aromatic amines as claimed in claim 1 wherein the suspension of acid sulphate of aromatic amine in the liquid medium is heated at a pressure which is less than atmospheric.

3. The process of claim 1 in which the liquid medium is a carbon compound.

4. The process which comprises mixing about 71.5 parts of alpha naphthylamine and about 240 parts of petroleum "white spirit" whose boiling range is about 150° to about 200° C. and bringing the temperature of the mixture to about 60° C., thereafter adding about 51 parts of about 95% sulphuric acid, then raising the temperature to about 160° C. and gradually adding about 400 parts more of "white spirit" so that the rate of addition is greater than the rate of distillation (if any) from the reaction mass, gradually raising the temperatures to about 180° C. and maintaining approximately that temperature for about one hour.

5. The process of preparing primary aminocarbocyclic-sulphonic acids of the benzene or naphthalene series which comprises converting the corresponding primary amino-carbocyclic compound to the acid sulphate of the amine in a solvent for the said compound whose boiling point is greater than the temperature required to change the said acid-sulphate to the desired sulphonic acid and which is inert to the reactants and thereafter converting the said acid sulphate to the desired sulphonic acid in the same liquid while heating.

6. The process of claim 5 in which the aminocarbocyclic compound is alpha naphthylamine.

7. Process for the manufacture of sulphonic acids of primary aromatic amines of the benzene or naphthalene series which comprises mixing an amine with a liquid whose boiling point is at least as high as that at which conversion of the acid sulphate of the amine in question takes place, which liquid is indifferent towards the amine and is not preferentially attacked by sulphuric acid, adding with agitation sulphuric acid to give the acid sulphate of the amine and heating the suspension of acid sulphate so obtained to a temperature sufficient to cause conversion of the amine acid sulphate to an amine sulphonic acid and removing the water produced as it is formed.

8. Process for the manufacture of sulphonic acids of aromatic amines as claimed in claim 7 in which the suspension of acid sulphate of aromatic amine in the liquid is heated under a pressure less than atmospheric pressure.

9. The process of claim 7 in which the amine treated is a xylidine.

10. The process of preparing primary aminocarbocyclic sulphonic acids of the benzene and naphthalene series which comprises heating the corresponding amino acid sulphate until it is converted to the desired sulphonic acid, the said heating being carried out in a high boiling mineral oil fraction suspension medium whose boiling point is at least as great as the temperature required to change the acid sulphate to the desired sulphonic acid, which is effectively chemically inert to the reactants and which is not preferentially attacked by the sulphonic acid.

11. The process of preparing primary aminocarbocyclic sulphonic acids of the benzene and naphthalene series which comprises heating the corresponding amino acid sulphate until it is converted to the desired sulphonic acid, the said heating being carried out in the high boiling mineral oil fraction suspension medium known as "white spirit" whose boiling point is at least as great as the temperature required to change the acid sulphate to the desired sulphonic acid, which is essentially chemically indifferent to the reactants and which is not preferentially attacked by the sulphonic acid.

12. The process of preparing primary amino carbocyclic sulphonic acids of the benzene and naphthalene series which comprises heating the corresponding amino acid sulphate until it is converted to the desired sulphonic acid, the said heating being carried out in a high boiling liquid carbon compound suspenson medium whose boiling point is at least as great as the temperature required to change the acid sulphate to the desired sulphonic acid, which is effectively chemically indifferent to the reactants and which is not preferentially attacked by the sulphonic acid.

13. The process which comprises mixing about 71.5 parts of a naphtylamine and about 240 parts of petroleum "white spirit" whose boiling range is about 150° to about 200° C. and bringing the temperature of the mixture to about 60° C., thereafter adding about 51 parts of about 95% sulphuric acid, then raising the temperature to about 160° C. and gradually adding about 400 parts more of "white spirit" so that the rate of addition is greater than the rate of distillation (if any) from the reaction mass, gradually raising the temperature to about 180° C. and maintaining approximately that temperature for about one hour.

MATTHEW FRANCIS STEPHEN CHOATE.
SAMUEL COFFEY.
CHARLES ROYSTON HENSHAW.